United States Patent
Weddington et al.

(10) Patent No.: US 10,146,572 B1
(45) Date of Patent: Dec. 4, 2018

(54) RESOURCE MANAGEMENT IN HYPERVISED COMPUTER SYSTEMS

(71) Applicant: Rockwell Collins, Inc., Cedar Rapids, IA (US)

(72) Inventors: Isaac B. Weddington, Hiawatha, IA (US); Paul L. Fiegen, Cedar Rapids, IA (US); Paul S. Heil, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 129 days.

(21) Appl. No.: 15/183,436

(22) Filed: Jun. 15, 2016

(51) Int. Cl.
  *G06F 9/455* (2018.01)
  *G06F 9/50* (2006.01)

(52) U.S. Cl.
  CPC ........ *G06F 9/45558* (2013.01); *G06F 9/5011* (2013.01); *G06F 2009/45591* (2013.01)

(58) Field of Classification Search
  None
  See application file for complete search history.

(56) References Cited

PUBLICATIONS

Vanderleest et al; A Safe & Secure Arinc 653 Hypervisor; IEEE 2013.*
Jin et al; Administrative Domain: Security Enhancement for Virtual TPM; IEEE 2010.*

* cited by examiner

*Primary Examiner* — Bing Zhao
(74) *Attorney, Agent, or Firm* — Angel N Gerdzhikov; Donna P. Suchy; Daniel M. Barbieri

(57) ABSTRACT

Computer systems and resource management methods utilized by such computer systems are disclosed. A computer system may include a shared resource and a processor coupled with the shared resource and configured to support a hypervisor. The hypervisor may be configured to partition the computer system into multiple virtual processing units for hosting multiple guest machines with access to the shared resource. One of the guest machines may be designated as a master machine configured to manage and facilitate sharing of the shared resource according to configuration data readable to the master machine.

12 Claims, 2 Drawing Sheets

RESOURCE MANAGEMENT IN HYPERVISED COMPUTER SYSTEMS

BACKGROUND

Some computer systems use software, firmware, or hardware implemented hypervisors to define logical partitions. Logical partitions may be defined, for example, to separate a single computing platform into multiple virtual processing units, allowing multiple copies of an operating system (OS) or multiple heterogeneous operating systems to be hosted on the same computing platform. The computing platform may be referred to as the host machine and the virtual processing units may be referred to as guest machines.

It is noted that while the guest machines may be configured to operate independently, they may also be configured to share certain resources. It is noted that managing such shared resources may be challenging, particularly when the guest machines are configured to support different operating systems or different design assurance levels.

SUMMARY

In one aspect, embodiments of the inventive concepts disclosed herein are directed to a computer system. The computer system may include a shared resource and a processor coupled with the shared resource and configured to support a hypervisor. The hypervisor may be configured to partition the computer system into multiple virtual processing units for hosting multiple guest machines with access to the shared resource. One of the guest machines may be designated as a master machine configured to manage and facilitate sharing of the shared resource according to configuration data readable to the master machine.

In a further aspect, embodiments of the inventive concepts disclosed herein are directed to a computer system. The computer system may include a shared resource and a processor coupled with the shared resource and configured to support a hypervisor. The hypervisor may be configured to partition the computer system into multiple virtual processing units for hosting multiple guest machines with access to the shared resource. One of the guest machines with the highest design assurance level among the guest machines may be designated as a master machine configured to manage and facilitate sharing of the shared resource according to configuration data readable to the master machine.

In another aspect, embodiments of the inventive concepts disclosed herein are directed to a method. The method may include: providing a hypervisor to partition a computer system into multiple virtual processing units; configuring the virtual processing units to host multiple guest machines with access to a shared resource; designating one of the guest machines with the highest design assurance level among the guest machines as a master machine; and configuring the master machine to manage and facilitate sharing of the shared resource according to configuration data readable to the master machine.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
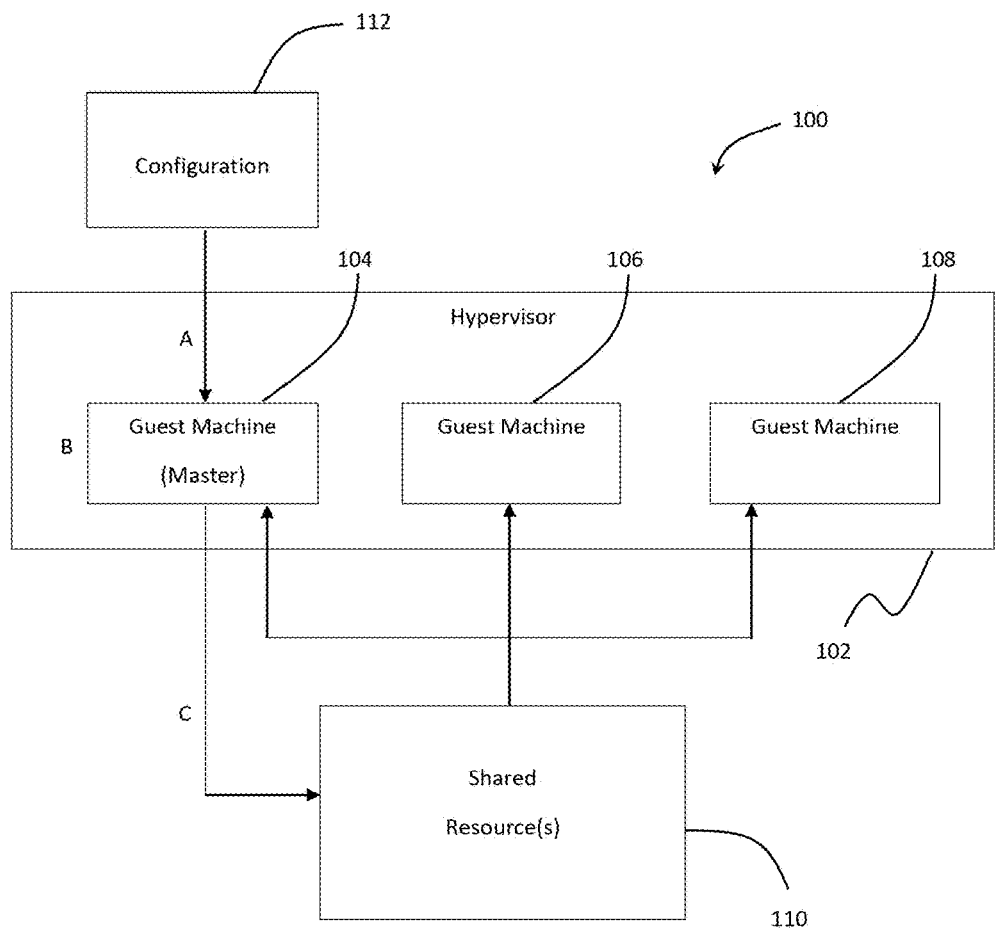
FIG. 1 is a block diagram of an exemplary computer system according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments of the inventive concepts disclosed herein are directed to hypervised computer systems (computer systems that utilize hypervisors to host guest machines) and resource management methods for such hypervised computer systems. A hypervised computer system configured in accordance with the inventive concepts disclosed herein may designate a guest machine with the highest design assurance level as a master machine. The designation of a master machine, along with access protections provided by the hypervisor, may jointly provide a "write-once, read-many" approach to help manage and distribute resource configurations among the various guest machines, effectively ensuring that all guest machines hosted on the hypervised computer system are set up to use the resources as intended regardless of the differences between the guest machines themselves.

Referring generally to FIG. 1, a block diagram of an exemplary computer system 100 configured in accordance with an embodiment of the inventive concepts disclosed herein is shown. The computer system 100 may include one or more processors 102 (which may be implemented as dedicated processing units, application-specific integrated circuits (ASICs), field-programmable gate arrays (FPGAs) or various other types of processors or processing units) configured to support a software, firmware, or hardware based hypervisor. The hypervisor may be configured to define a plurality of virtual processing units referred to as guest machines 104-108. The guest machines 104-108 may be configured to independently execute copies of an operating system (OS). Alternatively, the guest machines 104-108 may be configured to independently execute heterogeneous operating systems without departing from the broad scope of the inventive concepts disclosed herein.

While the guest machines 104-108 may operate independently with respect to each other, they may also share some resources 110 (e.g., memories, storage devices, network resources). It is noted, however, that ensuring all guest machines 104-108 are set up to use the shared resources 110 as intended may be challenging, especially if the guest machines 104-108 are configured to utilize different operating systems, support different design assurance levels, have different (or no) file system support, have different timing requirements, or set up to behave differently for various reasons. Accordingly, resource configuration data 112 may be provided in accordance with embodiments of the inventive concepts disclosed herein to help manage and facilitate resource sharing among the guest machines 104-108.

In some embodiments, the resource configuration data 112 may be provided as a configuration file digitally stored in a data storage device. Alternatively and/or additionally, the resource configuration data 112 may be hardcoded or printed. Regardless of the specific implementation of the resource configuration data 112, the purpose of providing the resource configuration data 112 is for it to be readable/accessible to one of the guest machines 104-108 designated (e.g., by a user) as the master machine, which is a guest machine (depicted as the guest machine 104 in FIG. 1 for illustrative purposes) that has the highest design assurance level among the guest machines 104-108 hosted on the computer system 100. The master machine 104 designated in this manner may be configured to manage and facilitate access to the shared resources 110 according to the resource configuration data 112.

More specifically, continuing with the example depicted in FIG. 1, the master machine 104 may read the configuration from the resource configuration data 112 in a step A. The master machine 104 may then parse at least a portion of the configuration data and validate the configuration data in a step B. If no configuration error is detected, the master machine 104 may populate/configure the shared resources 110, including, but not limited to, shared memory regions, shared flash devices, shared Peripheral Component Interconnect (PCI) devices, shared network resources and the like in a step C. If one or more configuration errors are detected, the master machine 104 may catch the configuration errors and provide fault tracking and/or handling as needed.

In some embodiments, the master machine 104 may be configured to identify the guest machines 104-108 using unique identifiers managed by the master machine 104. The master machine 104 may populate the shared resources 110 with the identifiers managed by the master machine 104, which may help avoid misidentification among the guest machines 104-108. In this manner, even if the guest machines 106 and 108 have their own identifiers (e.g., both may identify themselves as the "flight display"), because the shared resources 110 are populated by the master machine 104 with the identifiers managed by the master machine 104 (effectively rendering the identifiers used by the guest machines 106 and 108 themselves irrelevant from the perspective of the master machine 104), the guest machines 106 and 108 can still be uniquely identified.

The master machine 104 may also be configured to normalize the resource configuration data 112 and append the relevant portions of the resource configuration data 112 to the shared resources 110. For example, the master machine 104 may normalize the portion of the data regarding network configuration to a standard format understood by all guest machines 104-108 and write the normalized configuration data to a shared memory region of the shared resources 110. The master machine 104 may then send a synchronization signal to the other guest machines 106-108 in a step D once the master machine 104 finishes writing the configuration data to the shared memory region. Upon receiving the synchronization signal, the guest machines 106-108 may start reading (in parallel or in series) and parsing portions of the configuration data relevant to themselves to complete the configuration process.

It is noted that in accordance with the embodiments of the inventive concepts disclosed herein, only the master machine 104 may be allowed to have direct access to the resource configuration data 112 and the other guest machines 106-108 may be prevented from accessing the resource configuration data 112 directly. The other guest machines 106-108 may also be prevented from writing to the shared resources 110, a rule that can be enforced using the hypervisor running on the one or more processors 102 of the host machine 100. In this manner, only the master machine 104 may be configured to be responsible for parsing, interpreting, normalizing, and/or populating the configuration data for all guest machines 104-108, regardless whether the configuration data is specific to a particular guest machine 104-108 or universal to all guest machines.

It is to be understood that while the guest machine 104 is depicted as the master machine in the examples above, such a designation is merely for illustrative purposes and is not meant to be limiting. It is contemplated that the designation of the master machine may be altered under certain conditions. For example, if it is determined that the guest machine currently designated as the master machine is incapable of fulfilling its responsibilities (e.g., if the master machine fails to operate properly), another guest machine with the highest design assurance level (among the remaining guest machines) may be designated as a new master machine. Alternatively and/or additionally, it is contemplated that the host machine may be configured to fulfill some (or all) of the responsibilities of a master machine as describe above, as long as the host machine has the highest design assurance level compared to the guest machines hosted therein.

It is also contemplated that the designation of the master machine is not limited to a single machine. For instance, if more than one guest machines are designed to support the highest design assurance level, one or more of such guest machines may be designated as the master machines. If there are multiple configured/designated master machines, the master machines may self-select a single master machine at runtime (e.g., through certain types of synchronization mechanisms), which may function as the master machine and the non-selected master machines may function as regular guest machines. Alternatively, each master machine may provide configuration for a sub-set of regular guest machines. For example, suppose there are six guest machines, with guest machines 1 and 4 designated as master machines. Master machine 1 may be configured to provide configurations for guest machines 1, 2, and 3, while master machine 4 may be configure to provide configurations for guest machines 4, 5, and 6. It is noted that different approaches for handling the master machines may provide different advantages, and it is to be understood that specific implementations may vary without departing from the broad scope of the inventive concepts disclosed herein.

As will be appreciated from the above, computer systems configured in accordance with embodiments of the inventive concepts disclosed herein are capable of ensuring that all guest machines hosted on the computer systems are set up to use the shared resources as intended regardless of the differences between the guest machines themselves. Additionally, since the master machine (guest machine 104 in the examples above) is of the highest design assurance level, the possibility that a lower design assurance level guest machine may alter or corrupt safety-critical configuration data needed by a higher design assurance level guest machine hosted on the same host machine can be successfully mitigated. Further, it is noted that the only guest-to-guest interaction in loading the configuration data is between the master machine and the other guest machines. This limited interaction may be advantageous because typically the highest design assurance level guest machine is the one that also carries the safety-critical data that must be restored quickly in an emergency situation, effectively avoiding situations where a higher design assurance level guest machine must wait for a lower design assurance level guest machine to complete its initialization.

It is noted that computer systems configured in accordance with embodiments of the inventive concepts disclosed herein may also be appreciated in systems with a "warm start" requirement since configuration data that must be immediately restored can be held in a shared memory (not in a memory region of a guest machine), keeping the data intact during a warm start scenario. Each guest machine may be able to start restoring its operations immediately after a warm start, and in certain scenarios, the guest machines may not even need to wait for the master machine because the configuration data may already be available the shared memory.

It is also noted that computer systems configured in accordance with embodiments of the inventive concepts disclosed herein may be able to host one or more guest machines without file system support at all, which may be appreciated in certain operating conditions. In some embodiments, the master machine may read the configuration data direct from flash or other non-volatile memory to commence the confirmation process described above.

Further, it is noted that computer systems configured in accordance with embodiments of the inventive concepts disclosed herein may be adapted to serve as computing platforms onboard vehicles such aircraft and the like. The guest machines, for example, may be configured to host various types of avionic applications, some of which may require access to some shared resources. A computer system configured in accordance with an embodiment of the inventive concepts disclosed herein may therefore provide a solution for hosting the various avionic applications, allowing the various avionic applications to work together without impacting (or needing to know) the safety levels of each other, effectively providing a safe operating environment that may be appreciated for various reasons.

Figure 2:
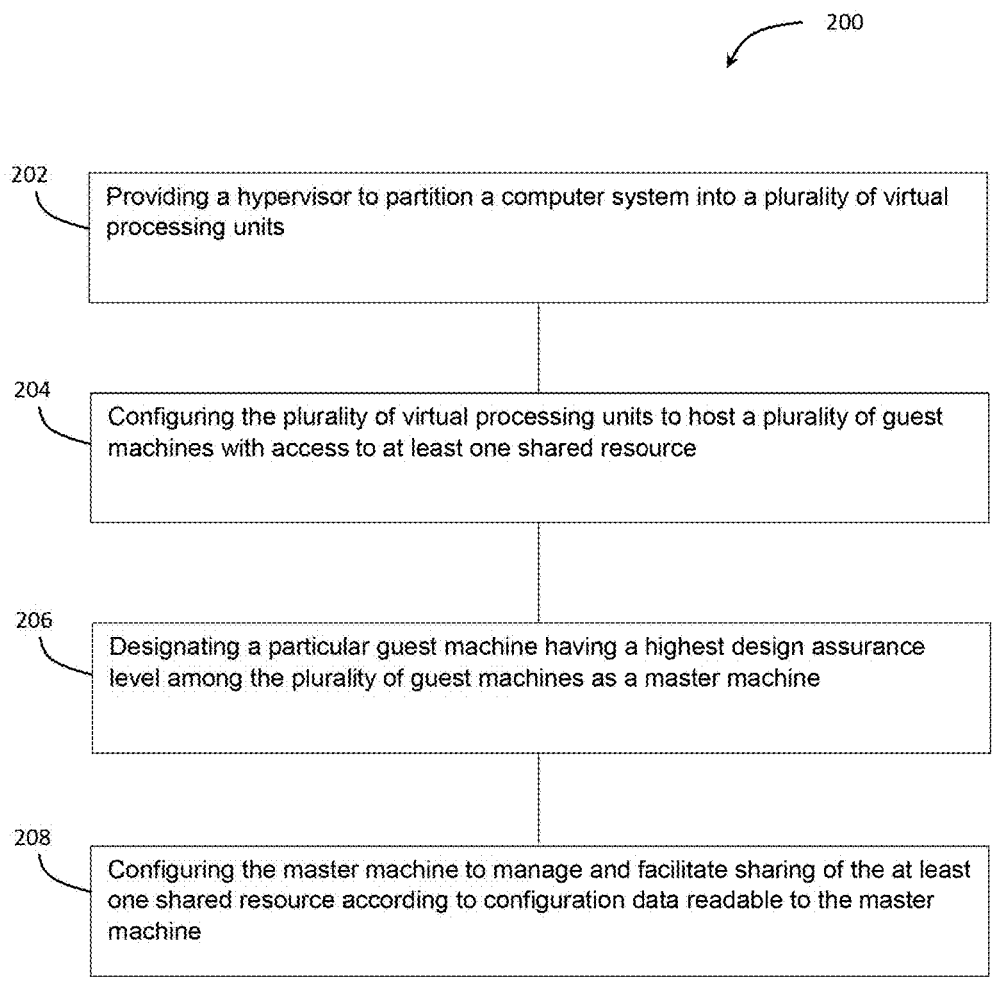
FIG. 2 is a flow diagram of an exemplary method for configuration a computer system according to an exemplary embodiment of the inventive concepts disclosed herein.

Referring now to FIG. 2, a flow diagram depicting of an exemplary method 200 for configuring a computer system in accordance with an embodiment of the inventive concepts disclosed herein is shown. The computer system may be hypervised in a step 202, where a hypervisor is provided to partition the computer system into multiple virtual processing units. The virtual processing units may then be configured in a step 204 to host multiple guest machines with access to one or more shared resources of the computer system. One of the guest machines with the highest design assurance level may be designated in a step 206 as a master machine, which may be configured in a step 208 to manage and facilitate sharing of the shared resources according to configuration data readable to the master machine as previously described.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A computer system, comprising:
at least one shared resource, wherein the at least one shared resource includes a secured area and a shared memory region; and
at least one processor coupled with the at least one shared resource and configured to support a hypervisor, wherein the hypervisor is configured to partition the computer system into a plurality of virtual processing units for hosting a plurality of guest machines with access to the at least one shared resource, wherein at least one guest machine of the plurality of guest machines is designated by a user as at least one master machine having a highest design assurance level among the plurality of guest machines, wherein the at least one master machine is a sole unit configured to access, parse, validate, and normalize a portion of configuration data, stored in the secured area to a standard format readable by the plurality of guest machines and write the normalized configuration data to the shared memory region of the at least one shared resource, wherein the at least one master machine is configured to send a notification signal to the plurality of guest machines and in response to receipt of the notification signal from the at least one master machine, each of the plurality of quest machines reads and parses the normalized configuration data that corresponds to itself in order to configure its own shared resource allocation amoung the plurality of guest machines, wherein the hypervisor is configured to prevent the plurality of guest machines from writing to the at least one shared resource except for the at least one master machine.

2. The apparatus of claim 1, wherein each guest machine is configured independently to execute copies of an operating system.

3. The apparatus of claim 1, wherein each guest machine is configured to independently execute heterogeneous operating systems.

4. The apparatus of claim 1, wherein the at least one master machine is configured to associate each guest machine of the plurality of guest machines with a unique identifier, and wherein the at least one master machine is further configured to associate configuration data specific to a particular guest machine with the unique identifier associated with that particular guest machine.

5. The apparatus of claim 1, wherein the at least one master machine is configured to catch one or more configuration errors and provide fault tracking and handling.

6. The apparatus of claim 1, wherein each guest machine is configured to support avionic applications.

7. A method, comprising:
providing a hypervisor to partition a computer system into a plurality of virtual processing units;
configuring the plurality of virtual processing units to host a plurality of guest machines with access to at least one shared resource, wherein the at least one shared resource includes a secured area and a shared memory region;
designating at least one guest machine with a highest design assurance level among the plurality of guest machines as at least one master machine; and
configuring the at least one master machine to enable accessing, parsing, validating, and normalizing a portion of configuration data, in the secured area, to a standard format readable by the plurality of guest machines and writing the normalized configuration data to the shared memory region of the at least one shared resource, wherein the at least one master machine is configured to send a notification signal to the plurality of guest machines and in response to receipt of the notification signal from the at least one master machine each of the plurality of guest machines reads and parses the normalized configuration data that corresponds to itself in order to configure its own shared resource allocation among the plurality of quest machines wherein the hypervisor is configured to prevent the plurality of guest machines from writing to the at least one shared resource except for the at least one master machine.

8. The method of claim 7, wherein the at least one master machine is configured to associate each guest machine of the plurality of guest machines with a unique identifier, and wherein the at least one master machine is further configured to associate configuration data specific to a particular guest machine with the unique identifier associated with that particular guest machine.

9. The method of claim 7, further comprising:
configuring each guest machine to independently execute copies of an operating system.

10. The method of claim 7, further comprising:
configuring each guest machine to independently execute heterogeneous operating systems.

11. The method of claim 7, further comprising:
configuring the at least one master machine to catch one or more configuration errors and provide fault tracking and handling.

12. The method of claim 7, further comprising:
configuring each guest machine to support avionic applications.

* * * * *